US011834054B2

(12) United States Patent
Palella et al.

(10) Patent No.: US 11,834,054 B2
(45) Date of Patent: Dec. 5, 2023

(54) METHOD FOR MOTION ESTIMATION IN A VEHICLE, CORRESPONDING DEVICE AND COMPUTER PROGRAM PRODUCT

(71) Applicants: STMICROELECTRONICS S.r.l., Agrate Brianza (IT); STMICROELECTRONICS, INC., Coppell, TX (US); STMicroelectronics (Grand Ouest) SAS, Le Mans (FR)

(72) Inventors: Nicola Matteo Palella, Rivolta D'Adda (IT); Leonardo Colombo, Lecco (IT); Andrea Donadel, Meda (IT); Roberto Mura, Milan (IT); Mahaveer Jain, Milpitas, CA (US); Joëlle Philippe, Le Mans (FR)

(73) Assignees: STMICROELECTRONICS S.r.l., Agrate Brianza (IT); STMICROELECTRONICS, INC., Coppell, TX (US); STMicroelectronics (Grand Ouest) SAS, Le Mans (FR)

( * ) Notice: Subject to any disclaimer, the term of this patent is extended or adjusted under 35 U.S.C. 154(b) by 184 days.

(21) Appl. No.: 17/470,962

(22) Filed: Sep. 9, 2021

(65) Prior Publication Data
US 2022/0080979 A1 Mar. 17, 2022

(30) Foreign Application Priority Data
Sep. 11, 2020 (IT) .................. 102020000021571

(51) Int. Cl.
*B60W 40/11* (2012.01)
*B60W 40/101* (2012.01)
(Continued)

(52) U.S. Cl.
CPC .......... *B60W 40/101* (2013.01); *B60W 40/11* (2013.01); *B60W 40/112* (2013.01);
(Continued)

(58) Field of Classification Search
None
See application file for complete search history.

(56) References Cited

U.S. PATENT DOCUMENTS

| 2002/0133271 A1 | 9/2002 | McDermott et al. |
| 2003/0195689 A1 * | 10/2003 | Mori ................... G01M 17/007 701/1 |

(Continued)

FOREIGN PATENT DOCUMENTS

EP 0 936 521 A2 8/1999

*Primary Examiner* — James M McPherson
(74) *Attorney, Agent, or Firm* — SEED INTELLECTUAL PROPERTY LAW GROUP LLP

(57) ABSTRACT

A system includes inertial sensors and a GPS. The system generates a first estimated vehicle velocity based on motion data and positioning data, generates a second estimated vehicle velocity based on the processed motion data and the first estimated vehicle velocity, and generates fused datasets indicative of position, velocity and attitude of a vehicle based on the processed motion data, the positioning data and the second estimated vehicle velocity. The generating the second estimated vehicle velocity includes: filtering the motion data, transforming the filtered motion data in a frequency domain based on the first estimated vehicle velocity, generating spectral power density signals, generating an estimated wheel angular frequency and an estimated wheel size based on the spectral power density signals, and generating the second estimated vehicle velocity as a function of the estimated wheel angular frequency and the estimated wheel size.

20 Claims, 8 Drawing Sheets

(51) Int. Cl.
  *B60W 40/112* (2012.01)
  *B60W 40/114* (2012.01)
  *G01S 19/47* (2010.01)

(52) U.S. Cl.
  CPC ........... *B60W 40/114* (2013.01); *G01S 19/47* (2013.01); *B60W 2520/28* (2013.01)

(56) References Cited

U.S. PATENT DOCUMENTS

| | | | | |
|---|---|---|---|---|
| 2004/0093128 | A1* | 5/2004 | Kin | ............... G01P 3/803 |
| | | | | 701/1 |
| 2004/0181320 | A1* | 9/2004 | Kane | ............... B61L 25/026 |
| | | | | 701/19 |
| 2006/0265112 | A1* | 11/2006 | Hoeffel | ............... B60T 8/172 |
| | | | | 701/32.4 |
| 2013/0090830 | A1* | 4/2013 | Eisele | ............... B60K 31/00 |
| | | | | 701/1 |
| 2013/0268172 | A1* | 10/2013 | Nandedkar | ............... G06F 17/00 |
| | | | | 701/1 |
| 2016/0305782 | A1 | 10/2016 | Al-Hamad et al. | |
| 2023/0081018 | A1* | 3/2023 | Naruse | ............... B60C 11/243 |

* cited by examiner

METHOD FOR MOTION ESTIMATION IN A VEHICLE, CORRESPONDING DEVICE AND COMPUTER PROGRAM PRODUCT

BACKGROUND

Technical Field

The description relates to the field of navigation, e.g., the capability of a device to determine a user position, velocity (speed) and attitude (e.g., 3D direction).

One or more embodiments may refer to techniques for providing navigation information, for instance in a land vehicle, including position and attitude information.

Description of the Related Art

A currently leading technology for positioning applications in the automotive field is GNSS (Global Navigation Satellite System), which is conventionally used in navigation systems including navigation and telematics.

Emerging applications such as autonomous driving, car-to-car (and car-to-infrastructure) communications will expectedly foster further technological challenges in the near future.

While capable of providing an absolute position reference, a GNSS receiver may possibly exhibit various drawbacks: for instance, it relies on a satellite signal which may be unavailable (e.g., indoor, tunnels) or corrupted (e.g., urban environments, reflections and/or multipath).

A motion and position sensor (MPS) electronic device may be used in a number of applications in various fields, such as automotive and consumer electronics, for instance. In the automotive field, it may be located onboard a vehicle.

Such an electronic device may comprise:
- a GNSS receiver, configured to provide an accurate position of the vehicle;
- an inertial measurement unit (IMU), including one or more inertial sensors (gyroscope, accelerometer, etc.), configured to provide (redundant) position information which may be exploited as a backup in case GNSS is either unavailable or corrupted, as mentioned; and
- a processing unit coupled to the GNSS receiver and to the IMU, such a unit being configured to receive data and to deploy these data to the benefit of an (external) user application.

As known to those of skill in the art, the IMU may provide position information according to classic theory of inertial navigation, namely integrating angular rates sensed by a gyroscope in order to obtain vehicle attitude data (pitch, roll, yaw angles with respect to reference framework, for instance) and integrating (twice) an acceleration/velocity (vehicle velocity, for instance) sensed by an accelerometer.

Accuracy of this processing may be affected by:
- calibration quality, which may be a key figure of merit concerning the gyroscope; and
- the capability of compensating earth gravity superimposed to the acceleration as measured by the accelerometer: if not properly compensated, this may lead to errors on velocity integration (and consequently on position).

Existing solutions to filter gravity contributions from accelerometer measurements rely on attitude compensation: this may involve rotating the accelerometer measurements by angles equal to attitude angles thus mapping them into a different reference frame, the so-called "navigation frame", which comprises a triad of axes (x, y, z) with x and y axes parallel to the earth surface and the z axis orthogonal thereto. In such a reference frame, the gravitational acceleration vector may be expressed as a vector g, e.g., g=[0, 0, 9.81 m/s$^2$], whose coordinates may be subtracted from data from the accelerometer.

Existing solutions may suffer from various drawbacks:
- calculation of the (vehicle) attitude may lead to velocity and position errors due to drifts in gyroscope measurements likely to increase with time (e.g., due to wear of the sensor); correcting such drifts may involve observing instant pitch/roll values provided by the accelerometer, with such an observation being possible mainly under special conditions (e.g., with vehicle stopped); and
- detecting further errors likely to affect the accelerometer sensor (e.g., cross-axis sensitivity) may involve measurements (and tailored compensation) in the sensor production line, which may lead to increased costs and complexity.

Due to the aforementioned time-evolving drift, in the absence of a GNSS signal, conventional inertial navigation systems can provide reliable navigation only for a limited period of time (for instance for about 1 minute): errors may undesirably grow beyond tolerances after such period.

BRIEF SUMMARY

In an embodiment, a method, comprises: receiving a motion dataset of motion data from at least one inertial sensing unit in a wheeled vehicle; receiving an absolute positioning dataset of absolute positioning data from a global navigation system in the wheeled vehicle; applying pre-processing to motion data in the motion dataset as a function of absolute positioning data in the absolute positioning dataset and obtaining a pre-processed motion dataset of pre-processed motion data and at least one estimated velocity value of the wheeled vehicle as a result; applying pipeline data processing to pre-processed motion data in the pre-processed motion dataset as a function of the at least one estimated velocity value of the wheeled vehicle and obtaining a calculated virtual vehicle velocity as a result; applying position-velocity-attitude, PVA, filtering to pre-processed motion data in the pre-processed motion dataset and to at least one of absolute positioning data in the absolute positioning dataset and the calculated virtual vehicle velocity, and obtaining a fused dataset of fused data indicative of position, velocity and attitude information of the vehicle as a result; and providing to a user circuit fused data in the fused dataset indicative of position, velocity and attitude information of the wheeled vehicle, wherein the pipeline data processing for obtaining the virtual vehicle velocity as a result comprises: high-pass or low-pass filtering pre-processed motion data in the pre-processed motion dataset and obtaining a filtered dataset of filtered data as a result; applying frequency-domain transformation to filtered data in the filtered dataset of filtered data and obtaining as a result a frequency analyzed dataset of frequency analyzed data comprising individual spectral power density signals including a set of power-maximizing frequencies; calculating, as a function of the set of power-maximizing frequencies in the frequency analyzed dataset of frequency analyzed data, a wheel angular frequency signal indicative of an angular frequency of a wheel of the wheeled vehicle and a wheel size signal indicative of a radial size of the wheel of the wheeled vehicle; and calculating the virtual vehicle velocity as a function of the wheel angular frequency signal and the wheel size signal.

One or more embodiments may relate to a corresponding device.

A vehicle motion and position sensor (VMPS) device (engine) may be exemplary of such a device, for instance.

One or more embodiments may relate to a corresponding system.

One or more embodiments may relate to the method as a computer-implemented method.

To that effect, one or more embodiments may comprise a computer program product loadable in the memory of at least one processing circuit (e.g., a computer) and comprising software code portions for executing the steps of the method when the product is run on at least one processing circuit. As used herein, reference to such a computer program product is understood as being equivalent to reference to computer-readable medium containing instructions for controlling the processing system in order to co-ordinate implementation of the method according to one or more embodiments. Reference to "at least one computer" is intended to highlight the possibility for one or more embodiments to be implemented in modular and/or distributed form.

One or more embodiments may be suitable for loading in the memory of at least one processing circuit (e.g., a micro-controller) and comprise software code portions for executing the steps of the method when the product is run on at least one processing circuit.

In an embodiment, a method, comprises: generating processed motion data and a first estimated vehicle velocity based on motion data generated by inertial sensing circuitry of a wheeled vehicle and positioning data generated by global positioning circuitry of the wheeled vehicle; generating a second estimated vehicle velocity based on the processed motion data and the first estimated vehicle velocity; and generating fused datasets indicative of position, velocity and attitude of the vehicle based on the processed motion data, the positioning data and the second estimated vehicle velocity. The generating the second estimated vehicle velocity includes: filtering the processed motion data, generating filtered motion data; transforming the filtered motion data in a frequency domain based on the first estimated vehicle velocity, generating spectral power density signals; generating an estimated wheel angular frequency and an estimated wheel size based on the spectral power density signals; and generating the second estimated vehicle velocity as a function of the estimated wheel angular frequency and the estimated wheel size.

In an embodiment, a device comprises: a filter, which, in operation, filters motion data; a transformer coupled to the filter, wherein the transformer, in operation, transforms the filtered motion data in a frequency domain based on a first estimated vehicle velocity and an estimated wheel size, generating spectral power density signals; a frequency detector coupled to the transformer, wherein the frequency detector, in operation, generates an estimated wheel angular frequency based on the generated spectral power density signals; a size estimator coupled to the frequency detector and to the transformer, wherein the size estimator, in operation, generates the estimated wheel size based on the estimated wheel angular frequency and positioning data; and a mixer coupled to the frequency detector and the size estimator, wherein the mixer, in operation, generates a second estimated vehicle velocity as a function of the estimated wheel angular frequency and the estimated wheel size.

In an embodiment, a system comprises: inertial sensing circuitry; a global navigation system transceiver; and processing circuitry coupled to the inertial sensing circuitry and to the global navigation system transceiver. The processing circuitry, in operation: generates processed motion data and a first estimated vehicle velocity based on motion data generated by the inertial sensing circuitry and positioning data generated by the global navigation system transceiver; generates a second estimated vehicle velocity based on the processed motion data and the first estimated vehicle velocity; and generates fused datasets indicative of position, velocity and attitude of a vehicle based on the processed motion data, the positioning data and the second estimated vehicle velocity. The generating the second estimated vehicle velocity includes: filtering the processed motion data, generating filtered motion data; transforming the filtered motion data in a frequency domain based on the first estimated vehicle velocity, generating spectral power density signals; generating an estimated wheel angular frequency and an estimated wheel size based on the spectral power density signals; and generating the second estimated vehicle velocity as a function of the estimated wheel angular frequency and the estimated wheel size.

In an embodiment, a non-transitory computer-readable medium's contents configure processing circuitry of a wheeled vehicle to perform a method, the method comprising: generating processed motion data and a first estimated vehicle velocity based on motion data generated by inertial sensing circuitry of the wheeled vehicle and positioning data generated by global positioning circuitry of the wheeled vehicle; generating a second estimated vehicle velocity based on the processed motion data and the first estimated vehicle velocity; and generating fused datasets indicative of position, velocity and attitude of the vehicle based on the processed motion data, the positioning data and the second estimated vehicle velocity. The generating the second estimated vehicle velocity includes: filtering the processed motion data, generating filtered motion data; transforming the filtered motion data in a frequency domain based on the first estimated vehicle velocity, generating spectral power density signals; generating an estimated wheel angular frequency and an estimated wheel size based on the spectral power density signals; and generating the second estimated vehicle velocity as a function of the estimated wheel angular frequency and the estimated wheel size.

One or more embodiments may be designed to obtain "stand-alone" vehicle velocity measurements from sensed IMU signals without integration and gravity compensation, independently of the presence and the quality of GNSS signals.

One or more embodiments may facilitate producing a user position and velocity measurement which has an increased, stable accuracy for longer periods of time with respect to existing solutions.

One or more embodiments may facilitate cost savings in production, for instance by skipping dedicated calibration procedures for IMU devices.

One or more embodiments may involve processing of measurement signals presenting an error distribution which may be advantageously easier to compensate: for instance, a Gaussian distribution without bias may facilitate canceling out systematic errors.

BRIEF DESCRIPTION OF THE SEVERAL VIEWS OF THE DRAWINGS

One or more embodiments will now be described, by way of non-limiting example only, with reference to the annexed Figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The headings/references used herein are provided merely for convenience and hence do not define the extent of protection or the scope of the embodiments.

Also, throughout the figures annexed herein, like parts or elements are indicated with like references/numerals unless the context indicates otherwise, and for brevity a corresponding description will not be repeated for each and every figure.

Figure 1:
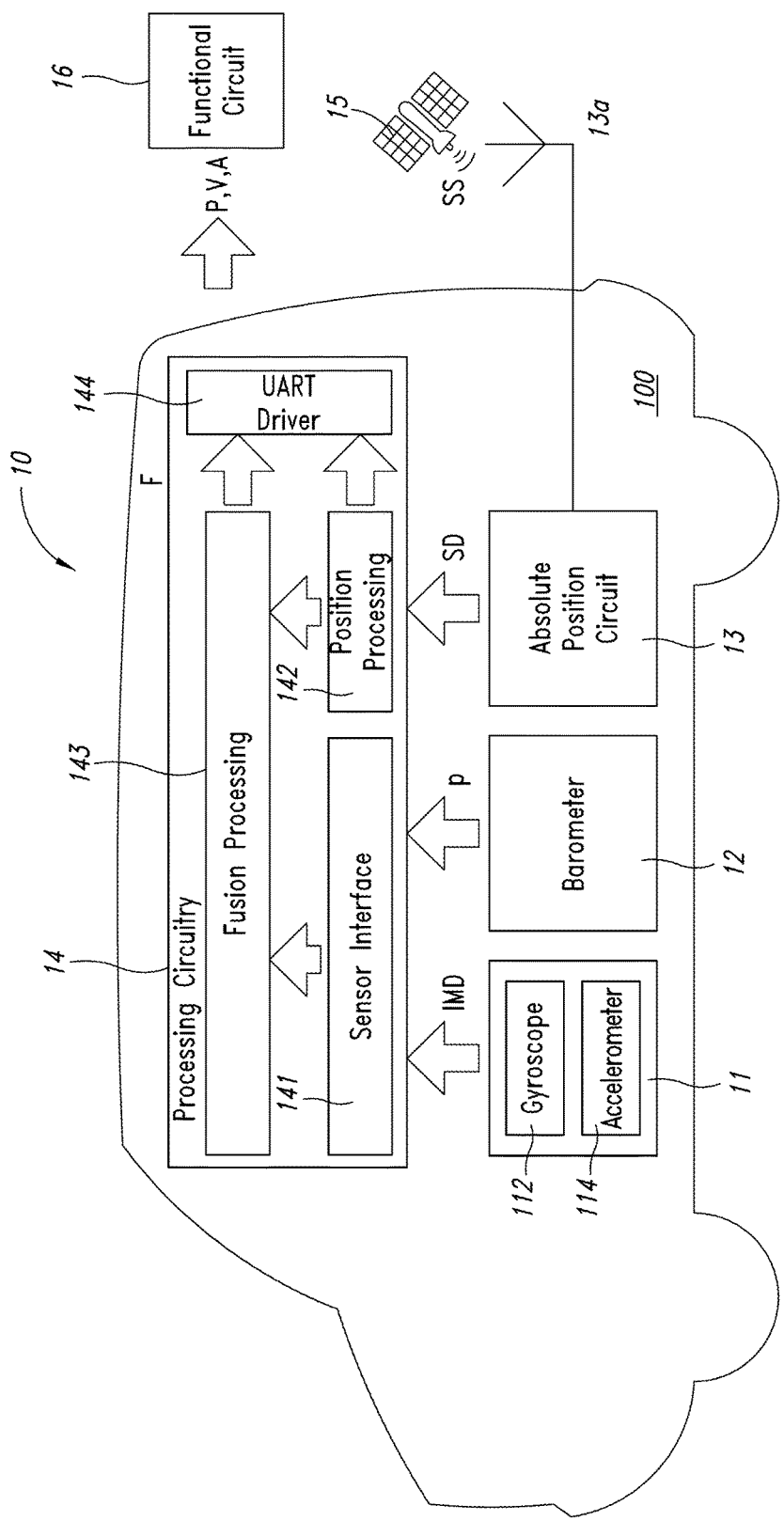
FIG. 1 is a diagram of a positioning device (engine) as exemplified herein.

FIG. 1 is a diagram of a positioning device ("engine") 10 configured to provide a measurement of (absolute) position (latitude, longitude and altitude, for instance) and motion (velocity and attitude, for instance) of a vehicle V (that is a mobile "platform") equipped therewith.

For the sake of simplicity, the following description will assume that the device 10 is mounted onboard a four-wheeled land vehicle. Such an assumption is purely exemplary and in no way limiting: one or more embodiments may be coupled to notionally any kind of wheeled vehicle V.

As exemplified in FIG. 1, the device 10 may comprise:
an inertial measurement unit or circuit (IMU) 11, e.g., digital six-axes IMU, comprising a (e.g., triaxial) gyroscope 112 and a (e.g., triaxial) accelerometer 114, providing inertial measurement data IMD as an output;
a barometer unit or circuit 12, e.g., a digital barometer, providing barometric pressure data p as an output;
an absolute positioning unit or circuit 13 configured to provide absolute positioning signal data SD as an output; and
processing circuitry 14 configured to receive and process (executing software code portions, for instance) data IMD, p, SD as provided as output by components 11, 12, 13; the processing circuitry 14 may be configured to compute a vehicle position P and motion quantities, specifically velocity V and attitude A.

For the sake of simplicity, one or more embodiments are discussed in the following with respect to a positioning device 13 comprising a GNSS (Global Navigation Satellite System) hardware receiver 13 configured to provide absolute positioning signal data SD, for instance receiving GNSS signals from one or more satellites 15 (via an antenna 13a optionally included in the device 10) and processing these signals in order to obtain measurements about the satellite distance from earth and relative motion, supplying them as satellite position data SD. It is noted that such an example is in no way limiting, as notionally any kind of (absolute) positioning device 13 may be employed as one or more embodiments. For instance, this may comprise a mobile phone configured to provide an absolute positioning data signal.

As exemplified in FIG. 1, the position processor 14 includes a (software) processing pipeline running thereon and comprising:
a sensor interface stage 141 comprising a set of drivers, e.g., I2C and/or SPI, configured to interface sensor (registers) of the IMU 11 and the barometer 12 to extract the IMD data and barometric pressure p data and format such extracted IMD data and barometric pressure p data in a format used by a fusion software module 143, as discussed in the following;
an absolute positioning data processing stage 142 configured to process absolute positioning data, such as a GNNSS processing stage configured to process satellite position data SD and calculate a GNSS-based position and altitude estimate, for instance;
a fusion processing stage 143 configured to apply data fusion to the data IMD, p, SD as provided from the IMU 11, the barometer 12 and the GNSS 13 and processed by the sensor interface 141 and GNSS software module 142 respectively. As a result of such data fusion, fused GNSS/sensor output data F are produced by the fusion processing stage 143; and
a UART (Universal Asynchronous Receiver-Transmitter) driver 144 configured to transmit fused GNSS/Sensor F data as vehicle position P, velocity V and attitude A values and provide them to one or more (external) user circuits and/or applications, such as an advanced driver assistance system (ADAS), for instance.

Figure 2A:
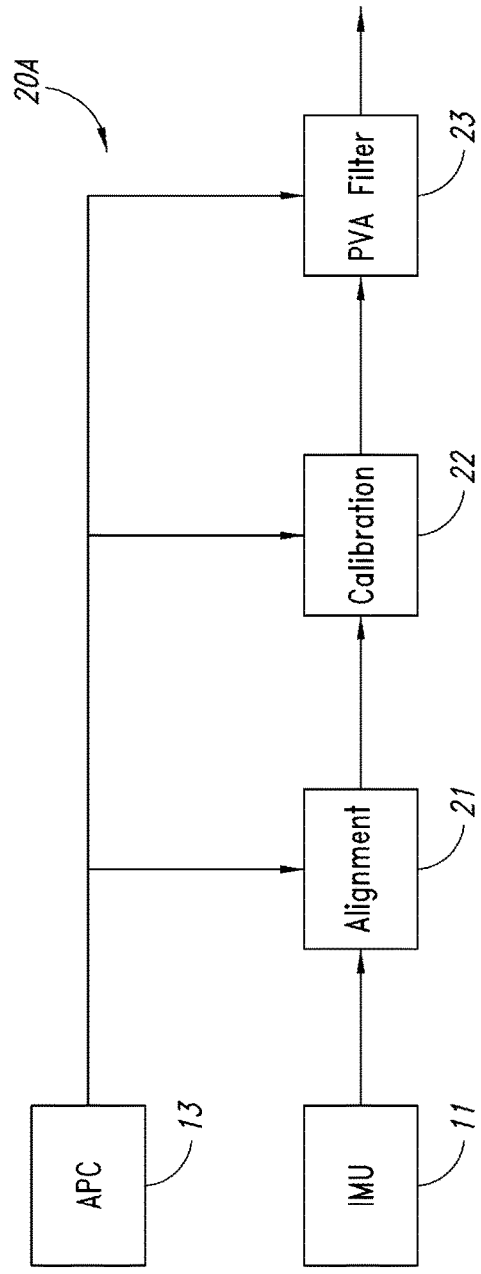
FIGS. 2A and 2B are diagrams exemplary of methods of processing sensor data.

In a conventional manner, a fusion processing stage 20A as exemplified in FIG. 2A may comprises a processing pipeline including:
an alignment stage 21, configured to receive respective signals IMD, SD from the GNSS and IMU devices 11, 13 and to apply alignment processing thereto, obtaining an aligned dataset IMD_a as a result;
a calibration stage 22, coupled to the alignment stage 21 and to the GNSS system 13; the calibration stage 22 is configured to receive the respective signals therefrom and apply calibration processing to such signals, obtaining a calibrated dataset IMD_c as a result; and a position-velocity-attitude (PVA) filter stage 23 coupled to the calibration stage 22 and to the GNSS system 13; the PVA filter stage 23 is configured to receive the respective signals IMD_c, v$_{GNSS}$ therefrom and apply to these signals PVA filtering processing 23, obtaining a fused dataset F as a result.

For instance, performing alignment processing in the alignment stage 21 may comprise:

detecting, e.g., by low-pass filtering and comparing the acceleration measured by x axis and versus the one which can be derived by GNSS (differentiating vehicle speed, for instance), the angles between reference frames of the IMU sensor 11 and the navigation frame, such as pitch, roll and yaw angles where pitch and the roll represent the displacement among sensor (x,y) and vehicle horizontal plans and yaw is the angle separating the direction ax1 of a first x axis of the sensor 11 from a forward direction of the vehicle; and applying rotational mapping to the sensor frame using the detected angles (e.g., using Direction Cosine Matrix or quaternion methods known per se), obtaining the aligned signals of the aligned dataset IMD_a as a result.

For instance, applying calibration processing to the aligned dataset IMD_a in the calibration stage 21 may be directed at reducing systematic errors components which may be present in data sensed by IMU sensor 11, producing the calibrated dataset IMD_c as a result, the calibration processing comprising:

in order to remove biasing errors due to motion contribution from the received dataset IMD_a, applying low pass filters tuned at different cutoff frequencies to the dataset IMD_a; and in order to remove errors due to scale factors from the received dataset IMD_a, comparing the aligned IMU signals IMD_a with GNSS signals.

For instance, applying PVA filtering processing in the PVA filtering stage 23 may comprise:

evaluating quality of GNSS position, velocity and attitude, e.g., receiving such an evaluation from the GNSS stage 13, and/or calculating it using the calibrated dataset IMU c received from the calibration stage 22 according to INS (inertial navigation system) theory, in a way known per se.

One or more embodiments may be based on the recognition that drawbacks of existing solutions can be overcome, obtaining an accurate velocity measurement from the IMU 11, by applying (direct) frequency response analysis to the signals IMD sensed by the IMU 11 and extracting therefrom a frequency component indicative of, for instance, proportional to, (wheel) angular rotation rate.

Figure 2B:
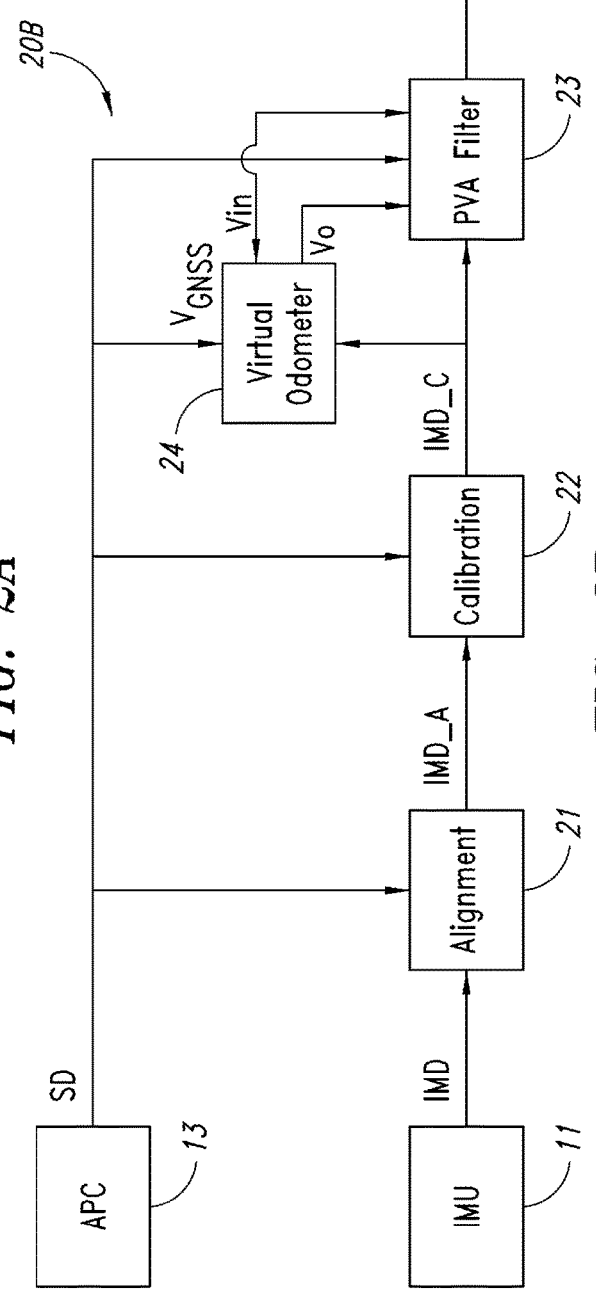

Such fusion processing may comprise a processing pipeline 20B as exemplified in FIG. 2B: this pipeline lends itself to being implemented in a stage of the device 10 such as 143.

In comparison with pipeline 20A, the pipeline 20B as exemplified in FIG. 2B may comprise an additional (virtual) odometer stage 24 coupled to the GNSS receiver 13, the calibration stage 22 and the PVA filter 23. As exemplified herein, the virtual odometer stage 24 is configured to receive velocity data from the GNSS receiver 13, the calibrated data IMD_c from the calibration stage 22 and velocity data filtered from the PVA filter stage 23, and calculate an odometer velocity dataset (that is, velocity data calculated in the virtual odometer stage 24) which is supplied to the PVA filter stage 23.

Figure 3:
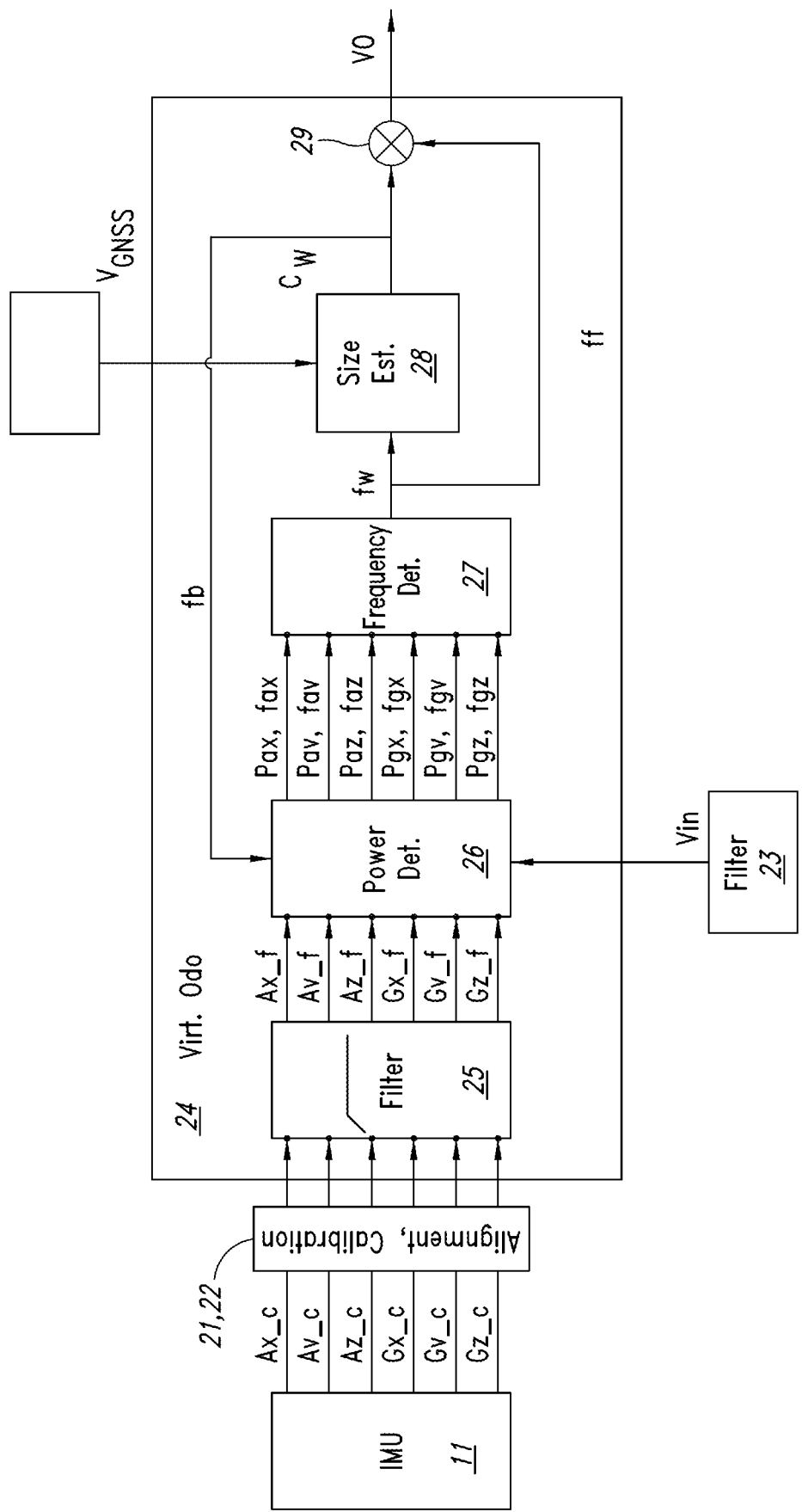
FIG. 3 is a diagram exemplary of a portion of the diagram of FIG. 2B.

FIG. 3 is a diagram showing possible details of the processing pipeline of FIG. 2, primarily expanding processing details of the virtual odometer stage or circuit 24.

As exemplified in FIG. 3, the data IMD from the IMU 11 may comprise a plurality of signals, e.g., three acceleration signals Ax, Ay, Az sensed by the accelerometer 112 and three gyroscopic signals Gx, Gy, Gz sensed by the gyroscope 114; data from the GNSS 13 provided to the odometer stage 22 may substantially comprise velocity measurement data.

As exemplified in FIG. 3, the virtual odometer stage 24 may comprise:

a filter 25 (high-pass or low-pass filter, for instance), configured to receive the calibrated dataset IMD_c (comprising a respective set of calibrated signals Ax_c, Ay_c, Az_c, Gx_c, Gy_c, Gz_c) and to apply (high/low-pass) filtering thereto, obtaining a filtered calibrated dataset Ax_f, Ay_f, Az_f, Gx_f, Gy_f, Gz_f;

a transforming/power detecting stage or circuit 26 coupled to the filter stage 25, to the PVA filter stage or circuit 23 and to an output of a (wheel size) estimator stage or circuit 28 via a feedback branch fb. The transforming/power detecting stage 26 may be configured to receive the filtered velocity from the PVA filter 23, the calibrated filtered dataset Ax_f, Ay_f, Az_f, Gx_f, Gy_f, Gz_f from the filter stage 25 and a feedback signal (initially zero) from the feedback branch fb and to produce a frequency analyzed dataset comprising calculated spectral power density signals P$_{ax}$, P$_{ay}$, P$_{az}$, P$_{gx}$, P$_{gy}$, P$_{gz}$ and frequencies f$_{ax}$, f$_{ay}$, f$_{az}$, f$_{gx}$, f$_{gy}$, f$_{gz}$ as discussed in the following. Spectral power density signals P$_{ax}$, P$_{ay}$, P$_{az}$, P$_{gx}$, P$_{gy}$, P$_{gz}$ may be obtained by applying frequency domain transformation to the input calibrated filtered dataset Ax_f, Ay_f, Az_f, Gx_f, Gy_f, Gz_f and by calculating spectral power in a frequency range Fr which may be determined as a function of the vehicle velocity yin estimated by GNSS 13, where for signals of the calibrated filtered dataset Ax_f, Ay_f, Az_f, Gx_f, Gy_f, Gz_f, the respective frequencies f$_{ax}$, f$_{ay}$, f$_{az}$, f$_{gx}$, f$_{gy}$, f$_{gz}$ having the highest power are selected;

a (wheel) frequency detecting stage 27 coupled to the IMU power detecting stage 26 and to a mixer stage 29 via a feedforward branch ff; the frequency detecting stage 27 may be configured to receive the frequency analyzed dataset P$_{ax}$, P$_{ay}$, P$_{az}$, P$_{gx}$, P$_{gy}$, P$_{gz}$, f$_{ax}$, f$_{ay}$, f$_{az}$, f$_{gx}$, f$_{gy}$, f$_{gz}$ therefrom, the frequency detecting stage 27 configured to provide a (wheel) rotation frequency signal f$_w$ by calculating an average of the received frequencies f$_{ax}$, f$_{ay}$, f$_{az}$, f$_{gx}$, f$_{gy}$, f$_{gz}$;

a (wheel) size estimating stage 28 coupled to the GNSS receiver 13 and to the frequency detecting stage 27 and configured to provide a signal Cw indicative of a (wheel) size; and a mixer stage 29 which receives the signal Cw indicative of a (wheel) size from the size estimating stage 28 and the rotation frequency signal f$_w$ from the frequency detecting stage 27 and to apply mixing processing 29 thereto, producing the (virtual) odometer dataset v$_o$ as a result which is estimated from the calculated frequency f$_w$ and the size of the wheel C$_w$.

Figure 4:
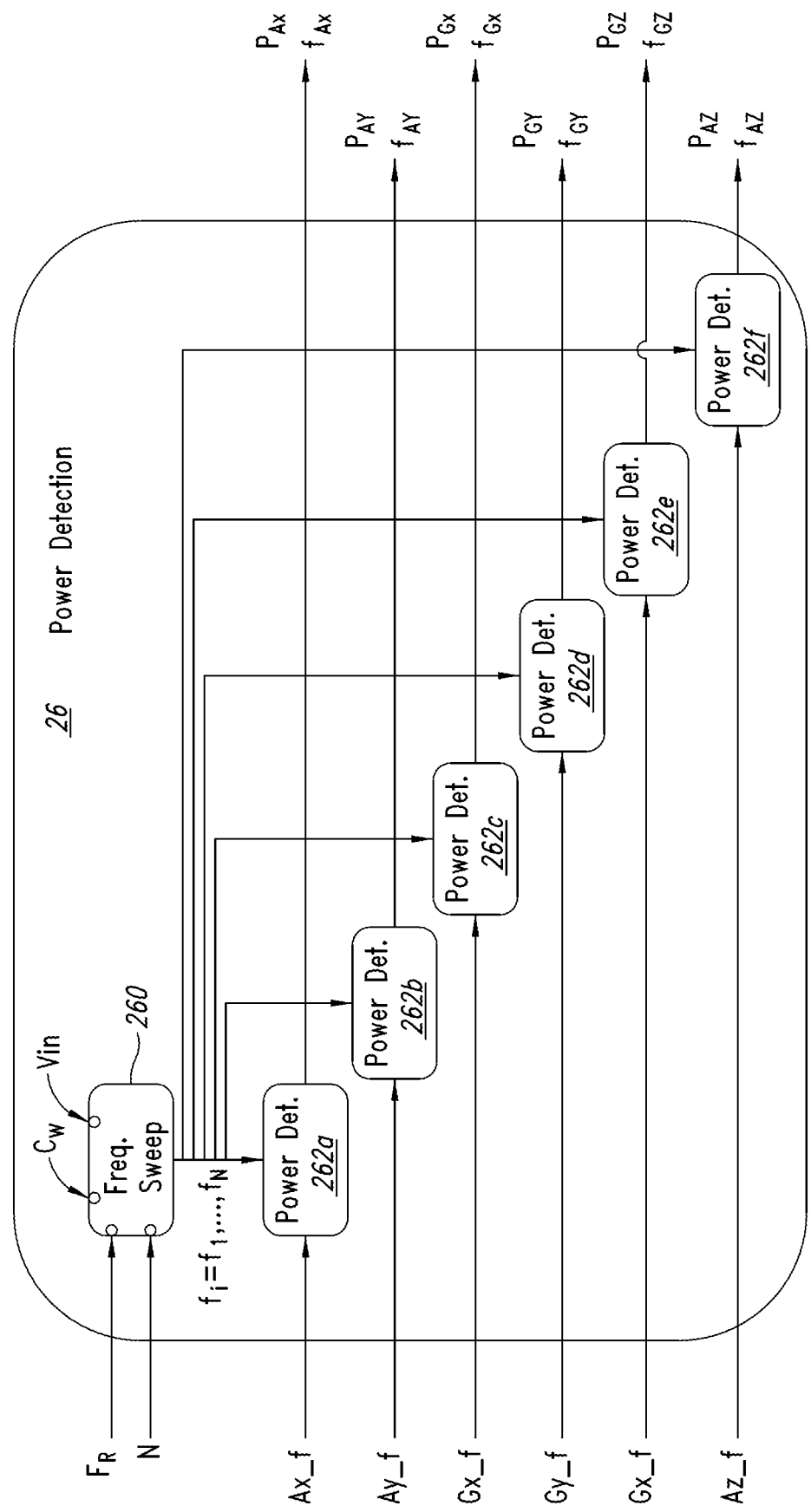
FIG. 4 is a diagram exemplary of a portion of the diagram of FIG. 3.

FIG. 4 is an exemplary diagram of the IMU power detecting stage 26.

As exemplified in FIG. 4, such a power detecting stage 26 may comprise:

a frequency sweeping stage 260 having a configurable frequency range parameter Fr and a configurable number of points parameter N, the frequency sweep stage 260 configured to receive the wheel size estimate dataset Cw from the size estimator stage 28 and the velocity value vin from the PVA filter 23 and to provide a set of frequency ranges $f_1, \ldots, f_i, \ldots, f_N$ to be used to process the calibrated filtered dataset Ax_f, Ay_f, Az_f, Gx_f, Gy_f, Gz_f input to the detecting stage 26; and a set of (parallel) axial power detecting sub-stages 262a, 262b, 262c, 262d, 262e, 262f, one per respective axis of the respective accelerometer/gyroscope 112, 114, each axial power detecting sub-stage is configured to receive a signal of acceleration or orientation data related to one axis and to apply frequency domain transformation thereto, using conventional techniques such as fast Fourier transform (FFT) or other discrete spectral estimation techniques as discussed in the following, for instance, providing as a result the respective power spectral density signal and (maximum) frequency value of the set of the frequency analyzed dataset $P_{ax}, P_{ay}, P_{az}, P_{gx}, P_{gy}, P_{gz}, f_{ax}, f_{ay}, f_{az}, f_{gx}, f_{gy}, f_{gz}$.

Figure 5A:
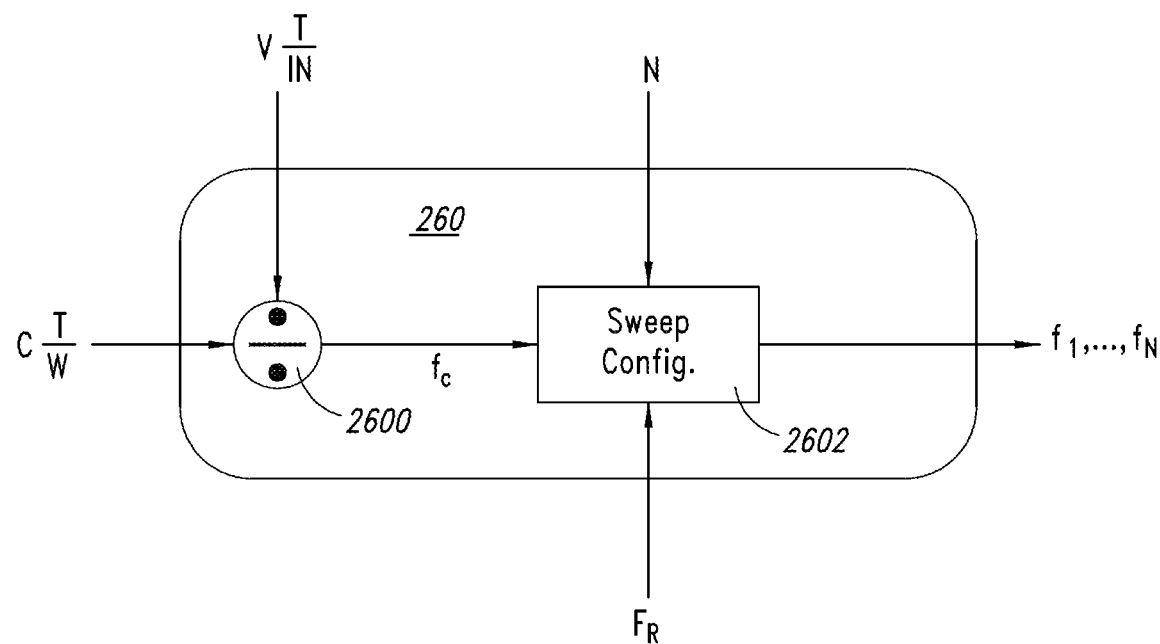
FIGS. 5A and 5B are diagrams exemplary of a portion of FIG. 4.

FIG. 5A is an exemplary diagram of a processing pipeline which may be incorporated in the frequency sweeping stage 260, which may comprise:

a divider stage 2600 configured to receive the wheel size estimate Cw and the velocity value vin from the PVA filter 23 and to obtain an estimate of a central frequency fc as a result of calculating a ratio of velocity yin over wheel (radius) size Cw, e.g., fc=vin/Cw; and a frequency sweep configuration stage 2602 coupled to the divider stage 2600 and configured to produce a sequence of frequency points $f_1, \ldots, f_i, \ldots, f_N$ as a function of the configurable number of points parameter N and frequency range parameter Fr. The frequency sweep configuration stage 2602 may produce the sequence of frequency points $f_1, \ldots, f_i, \ldots, f_N$ having a certain spatial distribution therebetween.

Figure 5B:
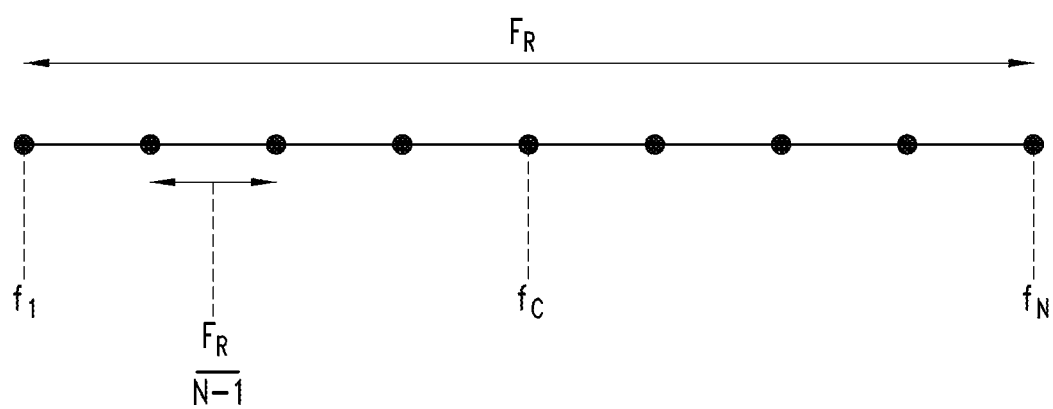

As exemplified in FIG. 5B, the points are uniformly distributed using a "linspace" method where the central frequency fc is placed at the center of the frequency range $F_R$ and frequency points $f_1, \ldots, f_i, \ldots, f_N$ are equidistant by a distance $$\frac{F_R}{N-1},$$

so that an i-th frequency point $f_i$ may be expressed as:

$$f_i = f_c - \frac{F_R}{2} + (i-1)\frac{F_R}{N-1}, \text{ for } i = 1, \ldots, N.$$

It is noted that such a distribution of points is purely exemplary and in no way limiting, being otherwise understood that one or more embodiments may produce the set of frequency points using any other type of spatial distribution, such as a Gaussian distribution where more density points are present close to the center frequency, for instance.

Figure 6:
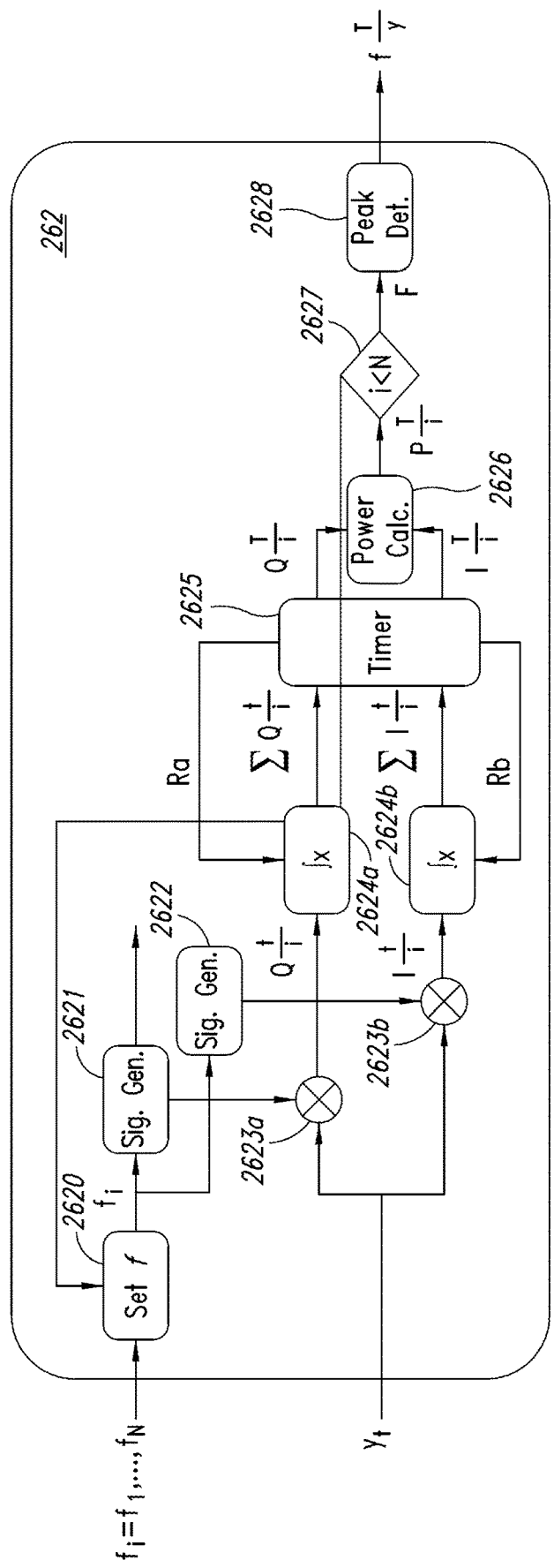
FIG. 6 is a diagram exemplary of a portion of FIG. 4.

FIG. 6 is an exemplary diagram of an axial power detecting processing pipeline 262 which may be implemented in each set of (parallel) axial power detecting sub-stages 262a, 262b, 262c, 262d, 262e, 262f, the pipeline 262 comprising:

a frequency setting stage 2620 coupled to a pair of signals generators 2621, 2622 comprising a first 2621 and a second 2622 generator each configured to generate a periodic signal at a configurable frequency, with respective periodic signals being in quadrature therebetween (such as sine and cosine signals, for instance), the frequency setting stage 2620 configured to receive the sequence of frequency points $f_1, \ldots, f_i, \ldots, f_N$ from the frequency sweeping stage 260 and to configure the signals generators to produce signals having a frequency equal to one of the frequency points of the received sequence of frequency points $f_1, \ldots, f_i, \ldots, f_N$; and a pair of parallel mixer stages 2623a, 2623b, comprising:
a first mixer 2623a coupled to the first, e.g., sine, signal generator 2621 and configured to apply mixer processing between the signal from the generator 2621 and a axial data signal $y_i$ of the of the set of calibrated filtered dataset Ax_f, Ay_f, Az_f, Gx_f, Gy_f, Gz_f input to the detecting stage 26, producing a first mixed signal $Q_i$ as a result; and a second mixer 2623b coupled to the second, e.g., sine, signal generator 2622 and configured to apply mixer processing between the signal from the generator 2622 and the same axial data signal yi provided to the first mixer stage 2623a, producing a second mixed signal $I_i$ as a result; and a pair of parallel integrating stages 2624a, 2624b, comprising a first integrating stage 2624a coupled to the first mixer stage 2623a and configured to receive the first mixed signal $Q_i$ therefrom and a second integrating stage 2624b coupled to the second mixer stage 2623b and configured to receive therefrom the second mixed signal $I_i$, the first and second integrating stages 2624a, 2624b configured to apply integration processing to respective signals $Q_i, I_i$, producing a pair of integrated mixed signals which may be expressed as:

$$\Sigma Q_i$$

$$\Sigma I_i$$

As exemplified in FIG. 6, the pipeline 262 may further comprise a timer stage 2625 coupled to the pair of integrator stage 2624a, 2624b and configured to trigger reset of the integrator processing (e.g., setting them to an initial zero value) as a function of a certain time threshold being reached, such as a time interval equal to a period of rotation T being reached; the timer stage 2625 may provide a pair of signals $Q_i^T, I_i^T$ equal to the time integral of signals $Q_i, I_i$ for such a period T of time.

Figure 7A:
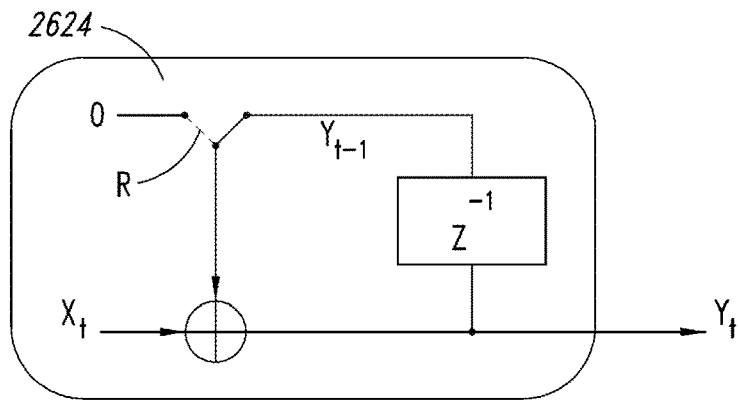
FIGS. 7A, 7B and 7C are diagrams exemplary of portions of FIG. 6.

As exemplified in FIG. 7A, the integrating stage 2624 comprises an adding node at which the input signal xi is added, as a function of a resettable switch, with either a zero signal or a signal resulting from applying a single pole to the previous value of the input signal.

The integrator stage 2624 as exemplified in FIG. 7A provides an output signal $y_t$ which may be expressed, at any time instant t, as follows:

$$y_t = \begin{cases} 0, & \text{if reset} = 1 \\ y_{t-1} + x_t, & \text{if reset} = 0 \end{cases}$$

As exemplified in FIG. 6, the pair of integrated signals are further processed in a power calculating stage 2626 coupled to the timer stage 2625 and configured to receive such time-integrated signals $Q_i^T, I_i^T$ and to apply power calculation processing thereto as discussed in the following, producing an i-th calculated power Pi as a result.

Figure 7B:
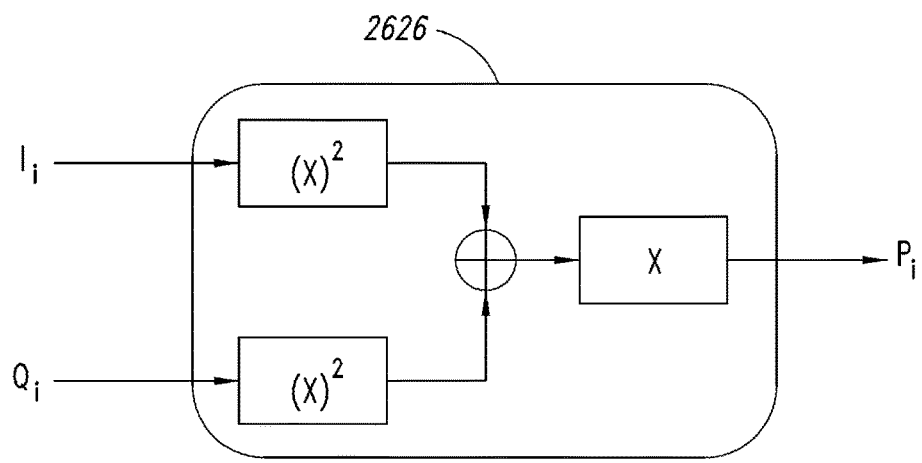

As exemplified in FIG. 7B, the power calculating stage 2626 may receive the pair of signals $Q_i^T$, $I_i^T$ and elevate each to the second power before adding them and calculating the square root of their sum, producing an estimate of signal power at the j-th frequency of the sequence of frequency points; thus, the calculated power value Pi may be expressed as:

$$P_i = \sqrt{(Q_i^T)^2 + (I_i^T)^2}$$

As exemplified in FIG. 6, the processing pipeline may further comprise a check stage 2627 coupled to the power calculating stage 2626, the check stage 2627 configured to increment a counter J and to check if processing has been performed a number of times equal to the number N of frequency points in the sequence of frequency points $f_1, \ldots, f_i, \ldots, f_N$ so that:

- if the counter J has reached or gone beyond the value of N processing is terminated,
- else, that is if the counter J is below the value N, the i-th calculated power Pi is passed on and the frequency setting stage 2620 is triggered to re-configure the signal generators to produce signals with a (i+1-th) frequency value equal to a frequency point in the sequence of frequency points $f_1, \ldots, f_i, \ldots, f_N$ following the (i-th) frequency point already "used"; and
- a peak (maximum) power detecting stage 2628 configured to collect each i-th calculated power values Pi processed at each j-th iteration of the processing 262, obtaining a spectral power density dataset $P_y$, the maximum power detecting stage 2628 configured to select a relative maximum value among the values of spectral power density dataset $P_y$ and to provide the frequency at which the power density dataset $P_y$ calculated is maximum as an output $f_y$.

Figure 7C:
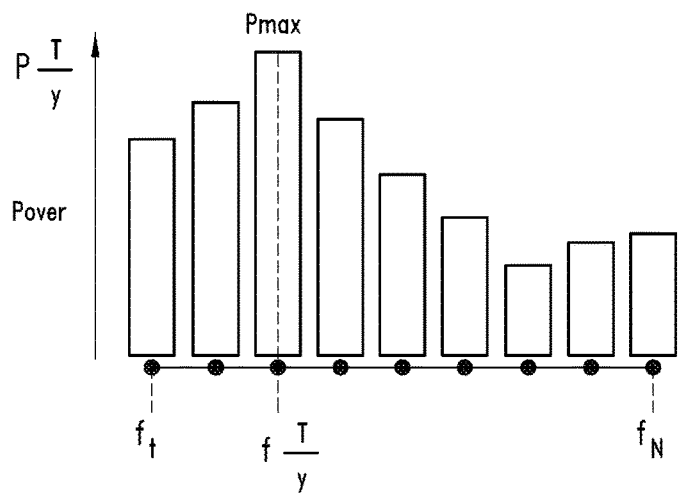

FIG. 7C reproduces an exemplary plot of collected values of the calculated power values Pi as a function of the frequency points in the sequence of frequency points $f_1, \ldots, f_i, \ldots, f_N$, where the relative maximum power value Pmax is detected at the frequency $f_y$.

Figure 8:
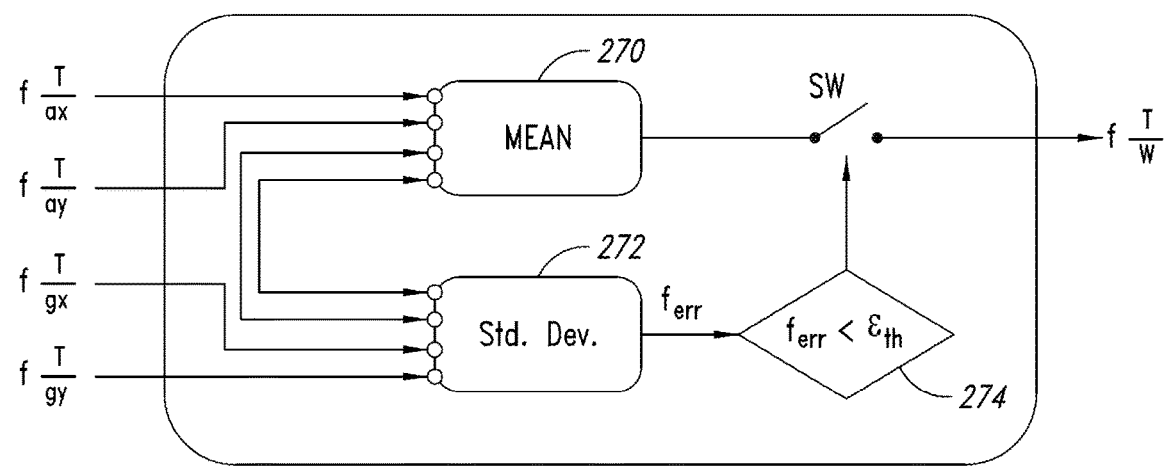
FIGS. 8 and 9 are diagrams exemplary of portions of the diagram of FIG. 3.

As exemplified in FIGS. 3 and 8, the detected frequencies $f_{ax}$, $f_{ay}$, $f_{gx}$, $f_{gy}$, related to axial spectral power densities $P_{ax}$, $P_{ay}$, $P_{gx}$, $P_{gy}$, relative to the axes x and y (of the "navigation reference frame, for instance) are provided and processed in the wheel frequency detecting stage 27, comprising:

- a first calculations stage 270 configured to process the frequencies $f_{ax}$, $f_{ay}$, $f_{gx}$, $f_{gy}$, for instance by calculating an average or mean value μ of in ways per se known to those of skill in the art;
- a second calculation stage 272 configured to calculate a standard deviation σ of the frequencies $f_{ax}$, $f_{ay}$, $f_{gx}$, $f_{gy}$; and
- a comparator stage 274 configured to compare the calculated standard deviation σ with a pre-set threshold value ε, the comparator stage configured to trigger a switch sw as a result of the standard deviation remaining below the pre-set threshold ε, where when the switch sw is in a closed stage it is configured to provide the computed mean frequency value μ as an output $f_w$ of the wheel frequency detection stage 27.

It is noted that such a way of processing frequencies in the first calculating stage 270 is purely exemplary and in no way limiting, being otherwise understood that other types of processing to extract a detected frequency therefrom may be used. For instance, the first calculating stage 27 may be configured to compute a weighted average, facilitating giving more importance to some axes, or a logical algorithm selecting one of the axes as a function of various parameters, such as the detected power $P_i$, for instance.

Figure 9:
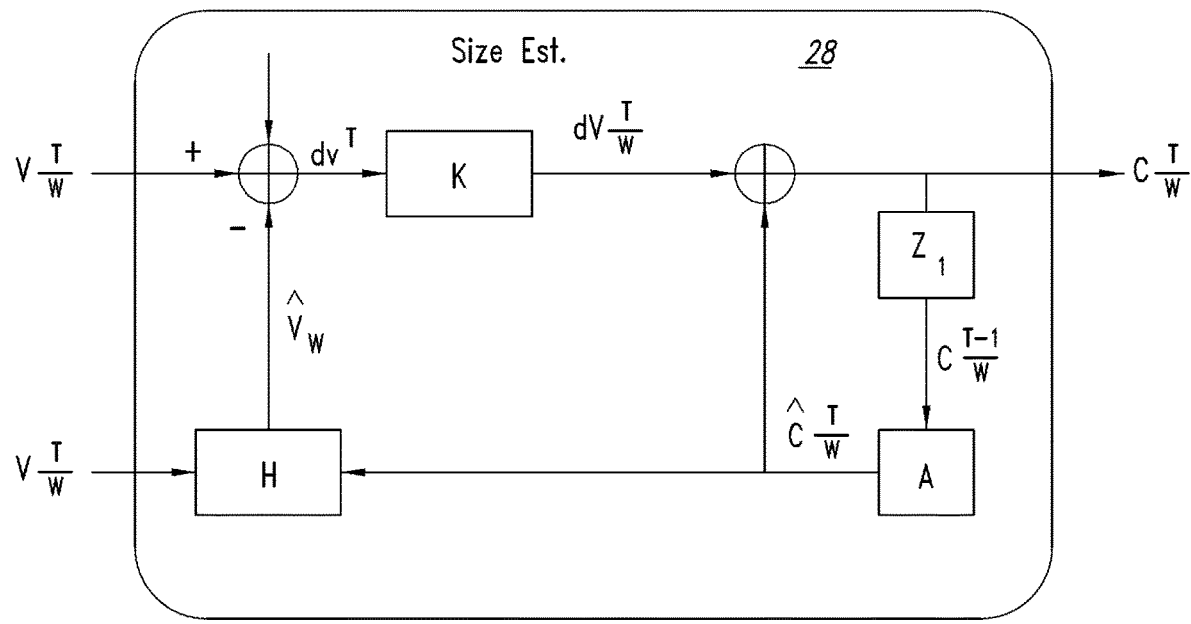

As exemplified in FIG. 9, the wheel size estimating stage 28 comprises a pipeline to estimate wheel size by comparing detected rotation frequency against a reference velocity, such as velocity $v_{GNSS}$ provided by the GNSS receiver 13, for instance.

In one or more embodiments, the velocity signals provided by other systems may be used, such as the velocity from the (real) odometer or the estimated velocity yin from the PVA filter stage 23.

As exemplified in FIG. 9, a Kalman filter (known per se to those of skill in the art) was found suitable for use in the wheel size detecting stage 28.

As exemplified in FIG. 9, the estimated wheel size Cw may be expressed as:

$$C_w^T = C_w^{T-1} + K dv^T$$

where $$\hat{C}_w^T = C_w^{T-1}$$

$$\hat{v}_w = \hat{C}_w^T f_w^T$$

$$dv^T = v_G^T - \hat{v}_w$$

with reference velocity $V_G = v_{GNSS}$, for instance.

It is noted that such a detection method is purely exemplary and in no way limiting, being otherwise understood that other methods may be suitable, such as a LS algorithm computed over a set of observations or a (low-pass) filter, for instance.

As exemplified herein, a method comprises:

- receiving a motion dataset (for instance, IMD) of motion data from at least one inertial sensing unit (for instance, 11, 112, 114) in a wheeled vehicle (for instance, 100);
- receiving an absolute positioning dataset (for instance, SD, $v_{GNSS}$) of absolute positioning data from a global navigation system (for instance, 13) in the wheeled vehicle;
- applying pre-processing (for instance, 21, 22, 23) to motion data in the motion dataset as a function of absolute positioning data in the absolute positioning dataset (for instance, SD) and obtaining a pre-processed motion dataset of pre-processed motion data (for instance, IMD_a, IMD_c; Ax_c, Ay_c, Az_c, Gx_c, Gy_c, Gz_c) and at least one estimated velocity value (for instance, $v_{in}$, $v_{GNSS}$) of the wheeled vehicle as a result;
- applying pipeline data processing (for instance, 24) to pre-processed motion data in the pre-processed motion dataset as a function of the at least one estimated velocity value of the wheeled vehicle and obtaining a calculated virtual vehicle velocity (for instance, $v_o$) as a result;
- applying position-velocity-attitude, PVA, filtering (for instance, 23) to pre-processed motion data in the pre-processed motion dataset and to at least one of absolute positioning data in the absolute positioning dataset and the calculated virtual vehicle velocity, and obtaining a fused dataset (for instance, F) of fused data indicative of position, velocity and attitude information of the vehicle as a result; and
- providing to a user circuit (for instance, 16) fused data in the fused dataset indicative of position, velocity and attitude information of the wheeled vehicle, wherein said pipeline data processing (for instance, 24) for obtaining said virtual vehicle velocity (for instance, $v_o$) as a result comprises:

high-pass or low-pass filtering (for instance, 25) pre-processed motion data in the pre-processed motion dataset and obtaining a filtered dataset of filtered data (for instance, Ax_f, Ay_f, Az_f, Gx_f, Gy_f, Gz_f) as a result;

applying frequency-domain transformation (for instance, 26, 260, 262) to filtered data in the filtered dataset of filtered data and obtaining as a result a frequency analyzed dataset of frequency analyzed data (for instance, $P_{ax}, P_{ay}, P_{az}, P_{gx}, P_{gy}, P_{gz}, f_{ax}, f_{ay}, f_{az}, f_{gx}, f_{gy}, f_{gz}$) comprising individual spectral power density signals (for instance, $P_a x, P_{ay}, P_{az}, P_{gx}, P_{gy}, P_{gz}$) including a set of power-maximizing frequencies (for instance, $f_{ax}, f_{ay}, f_{az}, f_{gx}, f_{gy}, f_{gz}$);

calculating, as a function of said set of power-maximizing frequencies (for instance, $f_{ax}, f_{ay}, f_{az}, f_{gx}, f_{gy}, f_{gz}$) in said frequency analyzed dataset of frequency analyzed data, a wheel angular frequency signal (for instance, $f_w$) indicative of an angular frequency of a wheel of the wheeled vehicle and a wheel size signal (for instance, $C_w$) indicative of a radial size of said wheel of the wheeled vehicle; and calculating (for instance, 29) said virtual vehicle velocity as a function of said wheel angular frequency signal and said wheel size signal.

As exemplified herein, applying said frequency domain transformation to the filtered dataset comprises:

selecting (for instance, 260) a frequency range (for instance, Fr) including a frequency value equal to a ratio of said estimated velocity value to said wheel size signal;

selecting a distribution function (for instance, 2602) and producing (for instance, 2600) a sequence of (for instance, N) frequency values (for instance, $f_1, \ldots, f_i, \ldots, f_N$) having a spatial distribution across said selected frequency range (for instance, Fr) determined by said selected distribution function (for instance, 2602); and performing spectral power calculation (for instance, 262, 262a, 262b, 262c, 262d, 262e, 262f) of individual signals (for instance, yi) in said filtered dataset of filtered data as a function of said sequence of frequency values producing said individual spectral power density signals of said frequency analyzed dataset as a result.

As exemplified herein, said spectral power calculation (for instance, 262, 262a, 262b, 262c, 262d, 262e, 262f) of individual signals (for instance, yi) in said filtered dataset of filtered data comprises:

sequentially selecting (for instance, 2620) a frequency point value (for instance, $f_i$) in said sequence of frequency values;

generating (for instance, 2621, 2622) a first (for instance, 2621) and a second (for instance, 2622) periodic signal at said selected frequency point value, with said first and second periodic signals being in quadrature therebetween;

applying mixing processing (for instance, 2623a, 2632b) between an individual signal (for instance, $y_i$) of said filtered dataset of filtered data and said first and second generated periodic signals, obtaining a pair of mixed signals (for instance, $Q_i, I_i$) as a result;

performing periodic time-integration (for instance, 2624a, 2624b) of the first (for instance, $Q_i$) and second (for instance, mixed signals, producing a pair of integrated mixed signals, wherein said periodic time-integration (for instance, 2624a, 2624b) comprises triggering reset (for instance, R) of said time-integration as a result of reaching a pre-set (for instance, 2625) time-threshold equal proportional to a period of wheel rotation;

calculating a square root of a sum of the second power (for instance, 2626) of the respective integrated mixed signals; and iterating N times (for instance, 2627) said sequentially selecting, said applying mixing processing, said performing periodic time-integration and said calculating the square root of the sum of the second power, providing an individual spectral power signal (for instance, $P_i$) as a result.

As exemplified herein, the method comprises:

detecting (for instance, 2628) power-maximizing frequency values (for instance, $f_i$) at which each individual power density signal (for instance, $P_i$) in said individual spectral power density signals has a relative maximum spectral power value (for instance, $P_{max}$); and collecting (for instance, 262a, 262b, 262c, 262d, 262e, 262f) said detected power-maximizing frequency values ($f_i$) in said set of power-maximizing frequencies.

As exemplified herein, said selecting (for instance, 2602) a distribution function comprises selecting a distribution function out of the group of distribution functions comprising uniform, weighted and gaussian distribution functions.

As exemplified herein, said calculating, as a function of said set of power-maximizing frequencies in said frequency analyzed dataset of frequency analyzed data, a wheel angular frequency signal (for instance, $f_w$) indicative of an angular frequency of a wheel of the wheeled vehicle (for instance, V), comprises:

calculating (for instance, 270) an average value and a variance of said set of power-maximizing frequencies in said frequency analyzed dataset; and verifying (for instance, 272) that said calculated variance of said set of power-maximizing frequencies is within (e.g., below) a pre-set threshold, providing (for instance, SW) an angular frequency signal (for instance, $f_w$) equal to said calculated average value of said set of power-maximizing frequencies as a result.

As exemplified herein, providing said wheel size signal (for instance, $C_w$) indicative of a radial size of a wheel of the wheeled mobile object comprises using a Kalman filter (for instance, K).

As exemplified herein, applying said pre-processing (for instance, 21, 22, 23) to motion data in said motion dataset as a function of absolute positioning data in said absolute positioning, comprises:

performing alignment (for instance, 21) of said motion dataset as a function of said absolute positioning dataset, obtaining an aligned motion dataset (for instance, IMD_a) as a result; and calibrating (for instance, 22) said motion dataset (for instance, IMD) as a function of said absolute positioning dataset (for instance, SD), obtaining a calibrated motion dataset (IMD_c) as a result.

As exemplified herein, a position engine device (for instance, 10) is configured to be coupled to with at least one inertial sensing unit (for instance, 11, 112, 114) and at least one global navigation system transceiver (for instance, 13) configured to be equipped on a wheeled vehicle (for instance, 100), the positioning engine device comprising processing circuitry (for instance, 14, 143) configured to provide a fused dataset (for instance, F) indicative position, velocity and attitude (for instance, P,V,A) information of the wheeled vehicle to a user circuit (for instance, 16) with the method according to one or more embodiments.

As exemplified herein, a wheeled vehicle (for instance, 100) is equipped with:
- at least one inertial sensing unit (for instance, 11, 112, 114);
- at least one global navigation system transceiver (for instance, 13), such as a global navigation satellite system, GNSS; and
- a positioning engine device (for instance, 10) according to one or more embodiments,
- wherein said positioning engine device is coupled to said at least one inertial sensing unit and said at least one global navigation system transceiver.

As exemplified herein, said at least one inertial sensing unit comprises a triaxial accelerometer (for instance, 112) and a triaxial gyroscope (for instance, 114).

As exemplified herein, a computer program product is loadable in the memory of at least one processing circuit (for instance, 14, 143) and comprises software code portions for executing the steps of the method according to one or more embodiments when the product is run on at least one processing circuit.

In an embodiment, a method, comprises: generating processed motion data and a first estimated vehicle velocity based on motion data generated by inertial sensing circuitry of a wheeled vehicle and positioning data generated by global positioning circuitry of the wheeled vehicle; generating a second estimated vehicle velocity based on the processed motion data and the first estimated vehicle velocity; and generating fused datasets indicative of position, velocity and attitude of the vehicle based on the processed motion data, the positioning data and the second estimated vehicle velocity. The generating the second estimated vehicle velocity includes: filtering the processed motion data, generating filtered motion data; transforming the filtered motion data in a frequency domain based on the first estimated vehicle velocity, generating spectral power density signals; generating an estimated wheel angular frequency and an estimated wheel size based on the spectral power density signals; and generating the second estimated vehicle velocity as a function of the estimated wheel angular frequency and the estimated wheel size. In an embodiment, transforming the filtered motion data in the frequency domain comprises: selecting a frequency range including a frequency value equal to a ratio of the first estimated velocity to the estimated wheel size; selecting a distribution function and producing a sequence of N frequency values having a spatial distribution across the selected frequency range determined by the selected distribution function; and calculating spectral power of individual signals as a function of the sequence of N frequency values, producing individual spectral power density signals. In an embodiment, the calculating the spectral power of the individual signals comprises: sequentially selecting a frequency point value in the sequence of N frequency values; generating a first periodic signal and a second periodic signal at the selected frequency point value, with the first and second periodic signals being in quadrature therebetween; applying mixing processing between an individual signal and the first and second generated periodic signals, obtaining first and second mixed signals as a result; performing periodic time-integration of the first and second mixed signals, producing a pair of integrated mixed signals, wherein the periodic time-integration comprises triggering reset of the time-integration as a result of reaching a determined time-threshold proportional to a period of wheel rotation; calculating a square root of a sum of the second power of the respective integrated mixed signals; and iterating N times the sequentially selecting, the applying mixing processing, the performing periodic time-integration and the calculating the square root of the sum of the second power. In an embodiment, the method comprises: detecting power-maximizing frequency values at which each individual power density signal in the individual spectral power density signals has a relative maximum spectral power value; and collecting the detected power-maximizing frequency values in a set of power-maximizing frequencies, wherein the estimated wheel angular frequency is generated based on the set of power-maximizing frequencies. In an embodiment, the generating the estimated wheel angular frequency comprises: calculating an average value and a variance of the set of power-maximizing frequencies in the frequency analyzed dataset; and verifying that the calculated variance of the set of power-maximizing frequencies is within a determined threshold, and selectively providing an angular frequency signal equal to the calculated average value of the set of power-maximizing frequencies based on the verifying. In an embodiment, the selecting a distribution function comprises selecting a distribution function out of a group of distribution functions consisting of uniform, weighted, and Gaussian distribution functions. In an embodiment, the generating the estimated wheel size comprises using a Kalman filter. In an embodiment, the generating processed motion data comprises: aligning motion data as a function of the positioning data, obtaining an aligned motion dataset; and calibrating the aligned motion dataset as a function of the positioning data, obtaining a calibrated motion dataset. In an embodiment, the inertial sensing circuitry comprises a triaxial accelerometer and a triaxial gyroscope.

In an embodiment, a device comprises: a filter, which, in operation, filters motion data; a transformer coupled to the filter, wherein the transformer, in operation, transforms the filtered motion data in a frequency domain based on a first estimated vehicle velocity and an estimated wheel size, generating spectral power density signals; a frequency detector coupled to the transformer, wherein the frequency detector, in operation, generates an estimated wheel angular frequency based on the generated spectral power density signals; a size estimator coupled to the frequency detector and to the transformer, wherein the size estimator, in operation, generates the estimated wheel size based on the estimated wheel angular frequency and positioning data; and a mixer coupled to the frequency detector and the size estimator, wherein the mixer, in operation, generates a second estimated vehicle velocity as a function of the estimated wheel angular frequency and the estimated wheel size. In an embodiment, the device comprises: inertial sensing circuitry coupled to the filter, wherein the inertial sensing circuitry, in operation, generates the motion data. In an embodiment, the inertial sensing circuitry comprises a triaxial accelerometer and a triaxial gyroscope. In an embodiment, the device comprises: global positioning system (GPS) circuitry coupled to the size estimator, wherein the GPS circuitry, in operation, generates the positioning data. In an embodiment, the device comprises: a position-velocity-attitude (PVA) filter coupled to the transformer and to the mixer, wherein the PVA filter, in operation, generates the first estimated vehicle velocity. In an embodiment, the transformer, in operation: selects a frequency range including a frequency value equal to a ratio of the first estimated velocity to the estimated wheel size; selects a distribution function and produces a sequence of N frequency values having a spatial distribution across the selected frequency range determined by the selected distribution function; and calculates spectral power of individual signals as a function of the sequence of N frequency values, producing individual spectral power density signals. In an embodiment, the transformer comprises a plurality of power detectors, each power detector comprising: a first periodic signal generator, which, in operation, generates a first periodic signal; a first integrator, which, in operation, integrates the first periodic signal; a second periodic signal generator, which, in operation, generates a second periodic signal; a second integrator, which, in operation, integrates the second periodic signal; and a power calculator coupled to the first integrator and the second integrator, wherein the power calculator, in operation, generates signals indicative of signal power. In an embodiment, the size estimator comprises a Kalman filter.

In an embodiment, a system comprises: inertial sensing circuitry; a global navigation system transceiver; and processing circuitry coupled to the inertial sensing circuitry and to the global navigation system transceiver. The processing circuitry, in operation: generates processed motion data and a first estimated vehicle velocity based on motion data generated by the inertial sensing circuitry and positioning data generated by the global navigation system transceiver; generates a second estimated vehicle velocity based on the processed motion data and the first estimated vehicle velocity; and generates fused datasets indicative of position, velocity and attitude of a vehicle based on the processed motion data, the positioning data and the second estimated vehicle velocity. The generating the second estimated vehicle velocity includes: filtering the processed motion data, generating filtered motion data; transforming the filtered motion data in a frequency domain based on the first estimated vehicle velocity, generating spectral power density signals; generating an estimated wheel angular frequency and an estimated wheel size based on the spectral power density signals; and generating the second estimated vehicle velocity as a function of the estimated wheel angular frequency and the estimated wheel size. In an embodiment, the processing circuitry comprises: a filter, which, in operation, filters motion data; a transformer coupled to the filter, wherein the transformer, in operation, transforms the filtered motion data in the frequency domain based on the first estimated vehicle velocity and the estimated wheel size, generating spectral power density signals; a frequency detector coupled to the transformer, wherein the frequency detector, in operation, generates the estimated wheel angular frequency based on the generated spectral power density signals; a size estimator coupled to the frequency detector and to the transformer, wherein the size estimator, in operation, generates the estimated wheel size based on the estimated wheel angular frequency and positioning data; and a mixer coupled to the frequency detector and the size estimator, wherein the mixer, in operation, generates the second estimated vehicle velocity as a function of the estimated wheel angular frequency and the estimated wheel size. In an embodiment, the inertial sensing circuitry comprises a triaxial accelerometer and a triaxial gyroscope. In an embodiment, the system comprises: a wheeled vehicle, the wheeled vehicle including the inertial sensing circuitry, the global navigation system transceiver, and the processing circuitry.

In an embodiment, a non-transitory computer-readable medium's contents configure processing circuitry of a wheeled vehicle to perform a method, the method comprising: generating processed motion data and a first estimated vehicle velocity based on motion data generated by inertial sensing circuitry of the wheeled vehicle and positioning data generated by global positioning circuitry of the wheeled vehicle; generating a second estimated vehicle velocity based on the processed motion data and the first estimated vehicle velocity; and generating fused datasets indicative of position, velocity and attitude of the vehicle based on the processed motion data, the positioning data and the second estimated vehicle velocity. The generating the second estimated vehicle velocity includes: filtering the processed motion data, generating filtered motion data; transforming the filtered motion data in a frequency domain based on the first estimated vehicle velocity, generating spectral power density signals; generating an estimated wheel angular frequency and an estimated wheel size based on the spectral power density signals; and generating the second estimated vehicle velocity as a function of the estimated wheel angular frequency and the estimated wheel size. In an embodiment, the contents comprise instructions, which, when executed by the processing circuitry, cause the processing circuitry to perform the method. In an embodiment, the transforming the filtered motion data in the frequency domain comprises: selecting a frequency range including a frequency value equal to a ratio of the first estimated velocity to the estimated wheel size; selecting a distribution function and producing a sequence of N frequency values having a spatial distribution across the selected frequency range determined by the selected distribution function; and calculating spectral power of individual signals as a function of the sequence of N frequency values, producing individual spectral power density signals.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a filter, which, in operation, filters motion data;
a transformer coupled to the filter, wherein the transformer, in operation, transforms the filtered motion data in a frequency domain based on a first estimated vehicle velocity and an estimated wheel size, generating spectral power density signals;
a frequency detector coupled to the transformer, wherein the frequency detector, in operation, generates an estimated wheel angular frequency based on the generated spectral power density signals;
a size estimator coupled to the frequency detector and to the transformer, wherein the size estimator, in operation, generates the estimated wheel size based on the estimated wheel angular frequency and positioning data; and a mixer coupled to the frequency detector and the size estimator, wherein the mixer, in operation, generates a second estimated vehicle velocity as a function of the estimated wheel angular frequency and the estimated wheel size.

2. The device of claim 1, comprising:

inertial sensing circuitry coupled to the filter, wherein the inertial sensing circuitry, in operation, generates the motion data.

3. The device of claim 2 wherein the inertial sensing circuitry comprises a triaxial accelerometer and a triaxial gyroscope.

4. The device of claim 2, comprising:

global positioning system (GPS) circuitry coupled to the size estimator, wherein the GPS circuitry, in operation, generates the positioning data.

5. The device of claim 4, comprising:

a position-velocity-attitude (PVA) filter coupled to the transformer and to the mixer, wherein the PVA filter, in operation, generates the first estimated vehicle velocity.

6. The device of claim 1, comprising:

a position-velocity-attitude (PVA) filter coupled to the transformer and to the mixer, wherein the PVA filter, in operation, generates the first estimated vehicle velocity.

7. The device of claim 1, wherein, the transformer, in operation:

selects a frequency range including a frequency value equal to a ratio of the first estimated vehicle velocity to the estimated wheel size; selects a distribution function and produces a sequence of N frequency values having a spatial distribution across the selected frequency range determined by the selected distribution function; and calculates spectral power of individual signals as a function of the sequence of N frequency values, producing individual spectral power density signals.

8. The device of claim 1, wherein the transformer comprises a plurality of power detectors, each power detector comprising:

a first periodic signal generator, which, in operation, generates a first periodic signal;

a first integrator, which, in operation, integrates the first periodic signal;

a second periodic signal generator, which, in operation, generates a second periodic signal;

a second integrator, which, in operation, integrates the second periodic signal; and a power calculator coupled to the first integrator and the second integrator, wherein the power calculator, in operation, generates signals indicative of signal power.

9. The device of claim 1, wherein the size estimator comprises a Kalman filter.

10. A system, comprising:

inertial sensing circuitry, which, in operation, generates motion data;

a global navigation system transceiver, which, in operation, generates positioning data; and processing circuitry coupled to the inertial sensing circuitry and to the global navigation system transceiver, wherein the processing circuitry includes:

a filter, which, in operation, filters motion data;

a transformer coupled to the filter, wherein the transformer, in operation, transforms the filtered motion data in a frequency domain based on a first estimated vehicle velocity and an estimated wheel size, generating spectral power density signals;

a frequency detector coupled to the transformer, wherein the frequency detector, in operation, generates an estimated wheel angular frequency based on the generated spectral power density signals;

a size estimator coupled to the frequency detector and to the transformer, wherein the size estimator, in operation, generates the estimated wheel size based on the estimated wheel angular frequency and positioning data; and a mixer coupled to the frequency detector and the size estimator, wherein the mixer, in operation, generates a second estimated vehicle velocity as a function of the estimated wheel angular frequency and the estimated wheel size.

11. The system of claim 10, wherein the inertial sensing circuitry comprises a triaxial accelerometer and a triaxial gyroscope.

12. The system of claim 10, comprising:

a position-velocity-attitude (PVA) filter, wherein the PVA filter, in operation, generates the first estimated vehicle velocity.

13. The system of claim 10, wherein, the transformer, in operation:

selects a frequency range including a frequency value equal to a ratio of the first estimated vehicle velocity to the estimated wheel size; selects a distribution function and produces a sequence of N frequency values having a spatial distribution across the selected frequency range determined by the selected distribution function; and calculates spectral power of individual signals as a function of the sequence of N frequency values, producing individual spectral power density signals.

14. The system of claim 10, wherein the transformer comprises a plurality of power detectors, each power detector comprising:

a first periodic signal generator, which, in operation, generates a first periodic signal;

a first integrator, which, in operation, integrates the first periodic signal;

a second periodic signal generator, which, in operation, generates a second periodic signal;

a second integrator, which, in operation, integrates the second periodic signal; and a power calculator coupled to the first integrator and the second integrator, wherein the power calculator, in operation, generates signals indicative of signal power.

15. The system of claim 10, wherein the size estimator comprises a Kalman filter.

16. A method, comprising:

filtering motion data using a filter;

transforming, using a transformer, the filtered motion data in a frequency domain based on a first estimated vehicle velocity and an estimated wheel size, the transforming generating spectral power density signals;

generating, using a frequency detector, an estimated wheel angular frequency based on the generated spectral power density signals;

generating, using a size estimator coupled to the frequency detector and to the transformer, the estimated wheel size based on the estimated wheel angular frequency and positioning data; and generating, using a mixer coupled to the frequency detector and the size estimator, a second estimated vehicle velocity as a function of the estimated wheel angular frequency and the estimated wheel size.

17. The method of claim 16, comprising:
generating the motion data using inertial sensing circuitry coupled to the filter.

18. The method of claim 16, comprising:
generating the positioning data using global positioning system (GPS) circuitry coupled to the size estimator.

19. A non-transitory computer-readable medium having contents which cause a processing device to perform a method, the method comprising:
filtering motion data;
transforming the filtered motion data in a frequency domain based on a first estimated vehicle velocity and an estimated wheel size, the transforming generating spectral power density signals;
generating an estimated wheel angular frequency based on the generated spectral power density signals;
generating the estimated wheel size based on the estimated wheel angular frequency and positioning data; and
generating a second estimated vehicle velocity as a function of the estimated wheel angular frequency and the estimated wheel size.

20. The non-transitory computer-readable medium of claim 19, wherein the contents comprise instructions executed by the processing device.

* * * * *